United States Patent [19]

Wingler et al.

[11] 4,200,713

[45] Apr. 29, 1980

[54] PROCESS FOR THE ANIONIC HOMO- OR CO-POLYMERIZATION OF AROMATIC VINYL COMPOUNDS

[75] Inventors: Frank Wingler, Leverkusen; Clemens Casper, Krefeld; Lothar Liebig, Leverkusen, all of Fed. Rep. of Germany

[73] Assignee: Bayer Aktiengesellschaft, Leverkusen, Fed. Rep. of Germany

[21] Appl. No.: 908,340

[22] Filed: May 22, 1978

Related U.S. Application Data

[63] Continuation of Ser. No. 829,366, Aug. 31, 1977, abandoned.

[30] Foreign Application Priority Data

May 4, 1977 [DE] Fed. Rep. of Germany ....... 2719972

[51] Int. Cl.$^2$ .......................... C08F 4/46; C08F 12/08
[52] U.S. Cl. ........................................ 526/64; 526/68; 526/88; 526/346; 526/347; 526/918
[58] Field of Search ...................... 526/64, 68, 88, 173, 526/185, 346, 347

[56] References Cited

U.S. PATENT DOCUMENTS

| | | | |
|---|---|---|---|
| 3,040,013 | 6/1962 | Kuhn | 526/88 |
| 3,210,163 | 10/1965 | Mommaerts | 526/64 |
| 3,236,828 | 2/1966 | Carter et al. | 526/64 |
| 3,414,499 | 12/1968 | Gardner et al. | 526/64 |
| 3,513,145 | 5/1970 | Crawford | 526/88 |
| 3,550,669 | 12/1970 | Lippert et al. | 159/6 |
| 3,560,460 | 2/1971 | Gilbert | 526/64 |
| 3,725,506 | 4/1973 | Bolte et al. | 526/173 |
| 3,834,441 | 9/1974 | Vernaleken et al. | 159/49 |
| 3,884,766 | 5/1975 | Bir et al. | 526/88 |
| 4,046,718 | 9/1977 | Mass et al. | 526/64 |
| 4,113,931 | 9/1978 | Spengler et al. | 526/64 |

FOREIGN PATENT DOCUMENTS

48-27752 8/1973 Japan ......................................... 526/64

*Primary Examiner*—Edward J. Smith
*Attorney, Agent, or Firm*—Gene Harsh; Joseph C. Gil; R. Brent Olson

[57] ABSTRACT

This invention relates to a process for producing a homopolymer or co-polymer of an aromatic vinyl monomer by anionically polymerizing a monomer mixture in the absence of oxygen in a tubular coil evaporator.

8 Claims, No Drawings

PROCESS FOR THE ANIONIC HOMO- OR CO-POLYMERIZATION OF AROMATIC VINYL COMPOUNDS

This is a continuation of application Ser. No. 829,366 filed Aug. 31, 1977, now abandoned.

This invention relates to a process for the anionic homopolymerisation or copolymerisation of aromatic vinyl compounds, in particular styrene and/or α-methyl styrene.

The anionic polymerisation of styrene by means of organometallic compounds of the metals of the first three Main Groups of the Periodic Table is known and is described for example in Heuben-Weyl, Methoden der organischen Chemie (1961), Vol. 14/1, pages 793–808. The anionic polymerisation of styrene is of commercial interest because it yields products having a narrow molecular weight distribution and also because the polymerisation reaction takes place quickly, cf. also A. N. Roper and R. N. Haward, Br. Polym. J. 1957, 7, 195–203 and the literature cited therein.

Unfortunately, considerable difficulties are involved in the anionic bulk polymerisation of styrene. The polymerisation reaction takes place extremely quickly and the heat of polymerisation cannot be completely dissipated through the walls of the reaction vessel in these short polymerisation times. As a result, the polymerisation mixture becomes heated, its temperature being capable of reaching peaks of more than 300° C.

Accordingly, it has been proposed to carry out the polymerisation process continuously under reduced pressure such that the heat of reaction is at least partly dissipated by vapour cooling and a maximum reaction temperature of 20° C. is not exceeded (cf. German Offenlegungsschrift No. 20 56 197). Polymerisation at temperatures below 20° C. requires the presence of a solvent because, at temperatures below 100° C., the anionically produced polymers harden to form a solid product and no further mixing is possible towards the end of the polymerisation reaction. Polymerisation can be carried out at temperatures below 20° C. in the absence of solvents, only up to a conversion limit of, for example, of 25 to 30% by weight of polystyrene in monomeric styrene. The polymerisation reaction can only be stopped with difficulty at certain conversions because living macro-anions are formed during the process and these continue to grow for as long as monomeric units are available.

The use of a relatively large quantity of the solvent presupposes elaborate purification of the solvent with recovery thereof which makes the process uneconomical in comparison with the radical bulk polymerisation process.

The object of the present invention is to find a process which enables aromatic vinyl compounds, especially styrene and/or α-methyl styrene, to be polymerised in controlled manner in short times by means of anionic initiators without any need to use relatively large quantities of solvents and without undesirable temperature peaks occurring, the conversions obtained being substantially complete.

According to the invention, this object is achieved by carrying out the polymerisation of aromatic vinyl compounds, especially styrene and/or α-methyl styrene, continuously in a tubular coil evaporator at a temperature of from −20° C. to +250° C., under a pressure of from 0.1 to 10 bars and in a polymerisation time of from 60 to 300 seconds.

Accordingly, the present invention provides a process for the continuous homopolymerisation or copolymerisation of aromatic vinyl compounds by means of organometallic compounds, wherein the polymerisation reaction is carried out in a tubular coil evaporator under the conditions specified above.

The following aromatic vinyl compounds may be homopolymerised or copolymerised by the process according to the invention: styrene and its derivatives, such as α-methyl styrene, α-cyanostyrene, α-trifluoromethyl styrene, α-fluoro-styrene, β-fluorostyrene, β,β-difluorostyrene, α, β, β-trichlorostyrene, o-chlorostyrene, p-chlorostyrene, p-fluorostyrene, p-bromostyrene, m-bromostyrene, p-iodostyrene, 2,3-dichlorostyrene, 2,4-dichlorostyrene, 2,3-difluorostyrene, 2,4-difluorostyrene, pentachlorostyrene, m-methylstyrene, 2,5-dimethyl styrene, p-tert.-butyl styrene, p-methoxy styrene, p-cyanostyrene, m-nitrostyrene, p-nitrostyrene and p-dimethylamino-p-styrene; 1-vinyl naphthalene, 2-vinyl naphthalene; 2-vinyl phenanthrene, 9-vinyl phenanthrene; 2-vinyl pyridine, 3-vinyl pyridine, 4-vinyl pyridine, 2-vinyl pyrid-N-oxide, 4-vinyl pyrimidine, 2-vinyl thiophene and N-vinyl carbazole.

Styrene and/or α-methyl styrene are preferably polymerised by this process. In another preferred embodiment, styrene and α-methyl styrene are copolymerised in a ratio by weight of from 70:30 to 40:60. Further monomers may also be introduced into the tubular coil evaporator at various points thereof so that block polymers can also be produced by the process according to the invention.

Tubular coil evaporators consist of a heatable or coolable, coiled descending tube and are described in German Auslegeschrift No. 1,667,051. The starting materials are fed in from above. The evaporator may be heated or cooled in different zones so that the polymerisation reaction may be initiated in the upper feed zone by heating the polymerisation mixtures. The polymerisation reaction is best initiated at a temperature around 20° C. Under the effect of the heat of reaction liberated, the mixture becomes heated and reaches its boiling point under normal pressure after a conversion of about 30 to 40% by weight. The mixture begins to boil in the tube, depending upon the pressure which may be obtained by way of the pressure prevailing at the lower outlet end of the tube and which is intended to amount to between 0.1 and 10 bars. The evaporating residual monomers keep the mixture at the reaction temperature and also serve as a carrier gas for transporting and mixing the reaction mixture. As a result of polymerisation and simultaneous evaporation, the reaction mixture is concentrated as it flows downwards through the tube and changes from a solution of the polymer in its monomers into a polymer melt. The conditions of pressure and jacket temperature must be selected so that the product flows off from the lower end of the tubular coil evaporator in the form of a melt having a mass temperature of from 160° to 250° C. The vapours are separated off from the , polymer melt. In order to terminate the living polymer chains formed during the polymerisation reaction, a proton-active compound may be added to the melt in conventional manner. This addition is preferably made by means of mixing pumps, in mixing screws, in so-called static mixers or inline mixers. Proton-active compounds are compounds which are able to react with the living macromolecule by transferring a hydrogen atom, for example, alcohols, water, amine, carboxylic acids, such as formic acid, acetic acid, propionic acid, benzoic acid, inorganic acids, such as hydrochloric acid, C-H-acid compounds such as, malonic acid derivatives and β-diketones. Conventional additives, such as levelling agents, plasticisers, stabilisers, filler, pigments, glass fibres, may be introduced into and mixed with the melts.

Any volatile constituents still present are separated off from the polymer melt in conventional evaporators, such as screw evaporators, plate evaporators, thin-layer evaporators and tubular-coil evaporators. After hardening, the melt is converted into the form of a granulate in conventional manner.

The volatile residual monomers separated off at the outlet end are characterised by their particular purity and, taking their concentration into account, may be immediately returned to the polymerisation process. The conversion, based on the monomers fed into the tubular coil evaporator, amounts to between 40 and 80% by weight. Taking into account the fact that the evaporated monomers are returned to the process, the yield of polymer amounts to between 60 and 99.5% by weight.

The polymerisation initiators used are the organometallic compounds of metals of the first three Main Groups of the Periodic Table of Elements (cf. Chemiker-Kalender by Dr. H. K. von Vogel, (1956) Springer Verlag, Berlin) which are known to initiate the anionic polymerisation of aromatic vinyl compounds. These organometallic compounds are, for example, butyl lithium, methyl lithium, lithium diisopropyl amide, triphenyl methyl sodium, naphthalene sodium, amyl sodium, the sodium or lithium compounds of fluorene, indene, phenyl indene, 1-3-diphenyl indene, tetrameric α-methyl styrene, triphenyl methyl potassium, dimethyl magnesium, allyl sodium and triethyl aluminium.

It is preferred to use butyl lithium, naphthalene sodium, α-methyl styrene tetramer disodium or dilithium. From 0.05 to 2 milliequivalents of the organometallic compound are used per mole of the aromatic vinyl compound.

The organometallic compounds are present in solution or suspension in an inert solvent or suspending agent. Suitable inert solvents or suspending agents are hydrocarbons, such as mineral spirits, hexane, pentane, benzene, toluene and xylene, ethers such as diethyl ether, diisopropyl ether, dioxane, tetrahydrofuran, ethylene glycol dimethyl ether, diethylene glycol dimethyl ether or hexamethyl phosphoric acid triamide and dimethyl formamide.

The concentration of the organometallic compounds in the solvents or suspending agents amounts to between 0.1 and 10 moles per liter. Complex-forming agents may be added during the process, in order to accelerate the polymerisation reaction. Accelerators such as these are tetrahydrofuran, pyridine, diazabicyclooctane, diisopropylamine, lithium methylate, lithium ethylate, tetramethyl ethylene diamine and crown ethers (cyclic ethers having at least three ether groups). The ratio of complexing agent to organometallic initiator amounts to between 0.1 and 10,000 mole %.

The initiator and accelerator are either mixed with the monomers in the tubular coil evaporator itself or shortly before introduction into the tubular coil evaporator. Mixing may be carried out by means of mixing nozzles, propeller mixers, mixing elements with static fittings and turbulent-flow mixing chambers. The mixing operation should not last any longer than 10 seconds at temperatures of from −20° C. to +20° C. The flow rate of the mixture in the tubular coil evaporator amounts to between 0.1 and 1 m/second and the average residence time of the mixture to between 1 and 5 minutes. Before use, the monomers and solvents must be purified, for example by known methods, such as purification over metal ketyls, metal hydrides, alkali alanates, molecular sieves or by azeotropic distillation.

The polymerisation reaction is carried out in the strict absence of oxygen. It may be carried out in the presence of an inert gas such as purified nitrogen, carbon dioxide, argon, helium or krypton. Where polymerisation is carried out in the presence of an inert gas, it is advisable either to free the inert gas from the evaporated monomers in condensers after the tubular coil evaporator stage or directly to return the inert gas to the process laden with the monomers. The quantity of inert gas used may amount to between 0.1 and 10 moles, based on 1 mole of monomer.

In order to reduce the heat of polymerization per batch introduced, already polymerised fractions may be added to the monomers. For example, a styrene monomer solution used as starting material may contain up to 35% by weight of polystyrene.

The particular advantage of the process according to the invention lies in its economy, the volume-time yields amounting to between 200 and 2000 g/l×h.

The polymers are characterised by a narrow molecular weight distribution and therefore show a favourable ratio of melt viscosity to mechanical strength. The polymers have intrinsic viscosities of from 0.4 to 1.6 dl/g, as measured in tetrahydrofuran at 25° C, and Vicat softening temperatures of from 80° C. to 120° C.

The resins produced by the process according to the invention are useful as thermoplastic moulding compositions for injection moulding, deep-drawing and moulded articles, such as tableware, fittings, domestic appliances, internal trim for motor vehicles, in boat building, in optics and in electronics. The resins are distinguished inter alia by their resistance to boiling water and, in addition, they can be excellently processed in injection moulding machines by virtue of their favourable melt flow properties.

EXAMPLES

Description of the Apparatus

The apparatus has a monomer reservoir in which the monomers purified by azeotropic distillation and filtration through molecular sieves are accommodated in an atmosphere of highly pure nitrogen. A double piston pump is available for metering. The initiator is provided in a glass burette, again in an atmosphere of highly pure nitrogen. The butyl lithium solution is metered by means of a fuel injection pump of the type used in automobiles. The flow of monomer is monitored by means of a turbine counter, whilst the flow of initiator is monitored by measuring off in the glass burette. The initiator solution and monomer stream are mixed through mixing nozzles in a mixing chamber. The residence time is less than 1 second. The resulting mixture is directly introduced at 20° C. into the upper head end of a tubular coil evaporator with a length of 18 meters, an internal diameter of 17 mm and 10 coils. The evaporator is heated with oil in three zones. A first upper zone with a length of 6 meters is kept at 60° C., a second central zone with a length of 6 meters is kept at 100° C. and the third lower zone is kept at 220° C. (wall temperature). The end of the tubular coil evaporator opens directly on to the feed zone of a screw extruder in which the monomer vapours are separated off from the polymer melt. By continuously injecting 1% by weight of methanol, based on polymer, into the screw, the living chains are inactivated and the volatile constituents are removed in a venting zone at 220° C./5 millibars. At the discharge end of the screw, the melt is drawn into a strand, quenched under water and subsequently granulated. The vapour-form monomers of the polymerisation stage which are separated off are condensed in condensers and are immediately returned to the polymerisation process, taking the quantitative flows into account, by means of a double piston pump and a turbine wheel counter. Examples 1 and 2 were carried out as described above. The data recorded were as follows:

EXAMPLE 1

| | |
|---|---|
| Monomer mixture, % by weight | 99 styrene, 1 tetrahydrofuran |
| kg/h | 30 |
| Temperature on entry, °C. | 20 |
| Initiator, millimoles/h | 195 butyl lithium, 1 molar in hexane |
| Average residence time in tubular coil evaporator, minutes | 3 |
| Temperature of product at outlet, °C. | 220 |
| Volume/time yield, kg/h.1 | 0.550 |
| Quantity of polymer, kg/h | 22.5 |
| Conversion, % by weight, based on monomer mixture fed in | 75 |
| Stopper, g/h | 225 methanol |
| Residual monomers recovered, kg/h | 7.5 |
| Pressure at head end, bars | 6.4 |
| Pressure on exit, bars | 0.7 |
| Intrinsic viscosity, 25° C. in THF, dl/g | 0.65 |
| Melt index (200° C. 5 kp) ASTM D 1258-65 T, | 10 g/10 mins. |
| Flexural strength, DIN 55 452, kg/cm$^2$ | 600 |
| THF = tetrahydrofuran | |

EXAMPLE 2

| | |
|---|---|
| Monomer mixture, % by weight | 50 styrene, 50 α-methyl styrene |
| kg/h | 30 |
| Temperature on entry, °C. | 20 |
| Initiator, millimoles/h | 250 naphthalene sodium, 1 molar in tetrahydrofuran |
| Pressure at head end, bars | 5.4 |
| Average residence time, mins. | 2 |
| Temperature of product at outlet, °C. | 220 |
| Conversion, % by weight, based on monomer mixture fed in | 70 |
| Quantity of polymer, kg/h | 21 |
| Volume/time yield, kg/l.h | 0.5 |
| Residual monomer, kg/h | 9 |
| Stopper, g/h | 21 methanol |
| Stopper, % by weight, based on polymer | 0.1 |
| Intrinsic viscosity, dl/g, 25° C. in THF | 0.45 |
| Melt index, (200° C., 5 kg) ASTM D 1238-65 T, | 0.5 g/10 mins. |
| Pressure on exit, bars | 0.6 |
| Flexural strength, DIN 55 452, kg/cm$^2$ | 550 |

We claim:

1. A process for the production of a homopolymer or copolymer of an aromatic vinyl monomer which comprises anionically polymerising a monomer mixture comprising at least one aromatic vinyl monomer with an organometallic compound of one of the first three Main Groups of the Periodic Table of Elements, wherein the polymerisation reaction is carried out continuously in the absence of oxygen in a tubular coil evaporator at a temperature of −20° C. to +250° C. and with an average residence time of from 60 to 300 seconds up to a total monomer conversion of from 60 to 99.5% by weight, from 20 to 60% by weight of the aromatic vinyl compounds fed into the tubular coil evaporator per unit of time evaporating and being returned to the tubular coil evaporator after condensation.

2. A process as claimed in claim 1, wherein the aromatic vinyl monomer is styrene, α-methyl styrene or a mixture thereof.

3. A process as claimed in claim 2, wherein styrene and α-methyl styrene are copolymerised in a ratio by weight of from 70:30 to 40:60.

4. A process as claimed in claim 1, wherein the polymerisation reaction is initiated at a temperature of substantially 20° C.

5. A process as claimed in claim 1, wherein the organometallic compound is butyl lithium, naphthalene sodium, α-methyl styrene tetramer disodium or dilithium.

6. A process as claimed in claim 1, wherein from 0.05 to 2 milliequivalents of the organometallic compound are used per mole of the aromatic vinyl monomer.

7. A process as claimed in claim 1, wherein polymerisation is carried out in an inert solvent or suspending agent.

8. A process as claimed in claim 7, wherein the concentration of the organometallic compound in the solvent or suspending agent is 0.1 to 10 moles per liter.

* * * * *